United States Patent [19]

Abernethy, III et al.

[11] 3,918,176

[45] Nov. 11, 1975

[54] VISUAL DIVIDED ATTENTION ALCOHOL SAFETY INTERLOCK SYSTEM

[75] Inventors: Charles N. Abernethy, III, Lynn; Americo A. Iannini, Marlboro, both of Mass.

[73] Assignee: The United States of America as represented by the Secretary of the Department of Transportation, Washington, D.C.

[22] Filed: May 22, 1974

[21] Appl. No.: 472,166

[52] U.S. Cl. ............................... 35/22 R; 180/99
[51] Int. Cl.² ............................................ G09B 19/00
[58] Field of Search ............... 35/22 R, 11, 12 D; 128/2 N; 180/99; 340/52, 53, 279

[56] References Cited
UNITED STATES PATENTS

| | | | |
|---|---|---|---|
| 1,564,138 | 12/1925 | Rowland | 35/11 |
| 1,729,227 | 9/1929 | Reid | 35/12 D |
| 1,953,954 | 4/1934 | Constable | 35/12 D |
| 2,341,678 | 2/1944 | Wickes | 35/12 D |
| 3,311,187 | 3/1967 | Haggard, Jr. | 180/99 X |
| 3,357,115 | 12/1967 | Kelley | 35/22 R |
| 3,483,302 | 12/1969 | Askenas et al. | 35/12 D X |
| 3,563,230 | 2/1971 | Gibbs | 128/2 N |
| 3,613,263 | 10/1971 | Schuster | 35/11 |
| 3,794,968 | 2/1974 | Hill | 340/279 X |

*Primary Examiner*—Wm. H. Grieb
*Attorney, Agent, or Firm*—Herbert E. Farmer; Harold P. Deeley, Jr.

[57] ABSTRACT

Disclosed herein is an intoxication testing system including means for simultaneously producing a pair of varying displays visible to a person under test who selectively operates corresponding actuators to produce responses dependent upon his reaction to the displays. Analyzers compare the selected responses with predetermined proper responses and an evaluation system measures and records the level to which the responses deviate from the predetermined proper responses.

10 Claims, 4 Drawing Figures

VISUAL DIVIDED ATTENTION ALCOHOL SAFETY INTERLOCK SYSTEM

BACKGROUND OF THE INVENTION

This invention relates to a visual divided attention testing system which determines whether an individual is intoxicated by testing and measuring his performance. The system can be employed either by law enforcement agencies for testing suspected drunken drivers or as part of an Alcohol Safety Interlock System (ASIS) which functions to automatically prevent the intoxicated from driving their vehicles.

Several types of systems have been proposed for measuring intoxication. These include psychomotor tasks which involve measuring performance on one or more of the following types of tests: simple reaction, pursuit tracking, compensatory tracking, mental arithmetic with keyboard entry, digit span memory with keyboard entry, visual flicker discrimination. All of these techniques have one or more disadvantages such as not effectively discriminating sober from intoxicated performance, requiring extensive training of the operator, or discriminating on skills not pertinent to driving such as numerical ability instead of discriminating on the basis of intoxication.

Also known are tasks more directly susceptible to the debilitating effects of alcohol such as: a complex coordination test and a tracking task with a specially driven forcing function. These two techniques also exhibit disadvantages such as failing to discriminate sober from intoxicated performance as well as does the visual divided attention task, requiring extensive training of the operator, or testing and therefore discriminating on skills not as pertinent as that skill whose debilitation under alcohol may more directly lead to accident involvement — the ability to adequately perform a visual divided attention task.

Finally, certain studies have been done investigating the effects of alcohol upon divided attention phenomena. However, the specific tasks previously used were inappropriate for various reasons including the use of tasks not entirely in the visual mode, the use of a central task not strongly alcohol-sensitive, placement of emphasis upon performing one task (usually the central) over the other, or use of task durations of prohibitive length.

The object of this invention, therefore, is to provide a visual divided attention testing system that more reliably and efficiently measures the debilitating effects of intoxication.

SUMMARY OF THE INVENTION

This invention is an intoxication testing system including means for simultaneously producing a pair of varying displays visible to a person under test who selectively operates corresponding actuators to produce responses dependent upon his reaction to the displays. Analyzers compare the selected responses with predetermined proper responses and an evaluation system measures and records the level to which the responses deviate from the predetermined proper responses.

In a preferred embodiment, the tests provided by the system entail both a pursuit tracking task and a task that measures detection reaction time to stimuli in the horizontal peripheral visual field. The pursuit tracking display is a randomly moving target that can be tracked by appropriate manipulation of an actuator wheel that produces predictable movement of a tracking indicator located in close proximity to the target. The display presented in the horizontal peripheral visual field comprises a plurality of light sets that are illuminated in a random sequence and each are associated with a specific electrical switch. The ability to actuate the switch associated with an energized light and the time required therefor are determined and these results are combined with the measured tracking error to provide a composite measurement of the intoxication level of the person under test.

One feature of the invention is the utilization of a feedback control between the peripheral visual display and the switch actuators for that display. The feedback system introduces signals that control the random sequences in which the signal lights are energized both as to light position, time interval and length of illumination periods. Thus, the random nature of the auxiliary display is in part responsive to the manipulation of the actuator switches by the person under test.

DESCRIPTION OF THE DRAWINGS

These and other objects and features of the present invention will become more apparent on a perusal of the following description taken in conjunction with the accompanying drawings wherein.

DESCRIPTION OF THE PREFERRED EMBODIMENT

Figure 1:
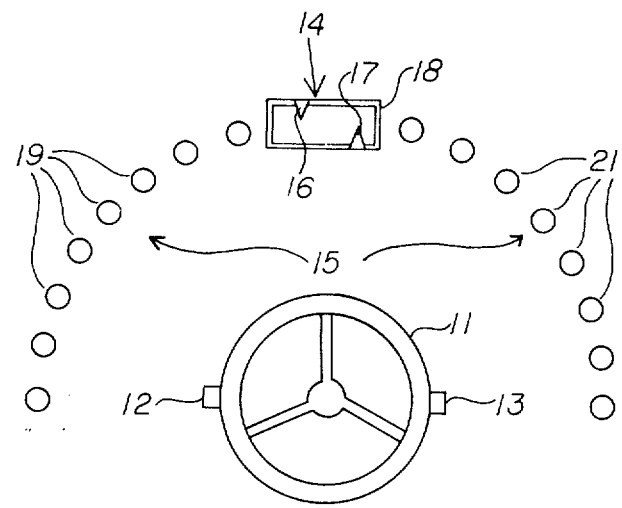
FIG. 1 is a schematic drawing illustrating the relative positions of the pair of displays and actuators utilized in the invention.

Referring now to FIG. 1 there is schematically illustrated a rotatable wheel 11 that simulates the steering wheel of a vehicle. Mounted at diametrically opposed positions on the wheel 11 are left and right horizontal peripheral visual field response switches 12 and 13, respectively. Positioned so as to be visible to one operating the wheel 11 and the switches 12 and 13 are a pursuit tracking display 14 and a horizontal peripheral visual field display 15. The pursuit tracking display 14 includes a pair of illuminated image indicators 16 and 17 movable on a screen 18 as described in greater detail below. Comprising the peripheral visual field display 15 are a first set of lights 19 associated with the left response switch 12 and a second set of lights 21 associated with the right response switch 13. The two sets of lights 19 and 21 are arranged in a semicircular array and are separated by the screen 18.

Figure 2:
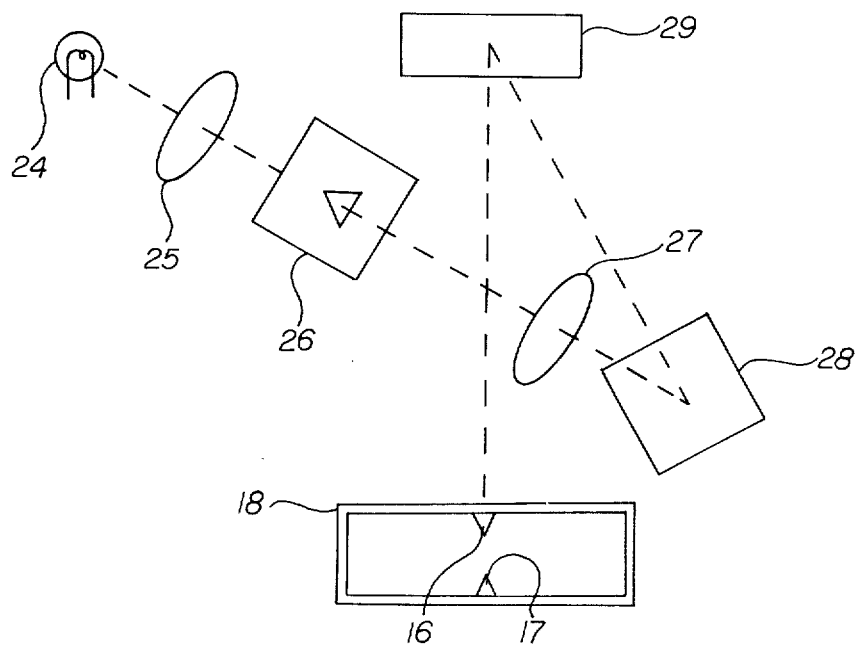
FIG. 2 is a schematic drawing of an optical system utilized to produce the pursuit tracking display of the invention.

FIG. 2 schematically illustrates an optical system for producing the image indicator 16 shown in FIG. 1. Light from a source 24 is focused by a lens 25 on a mask 26 producing an indicator image that is transmitted by a lens 27 onto the reflecting surface of a mirror 28. The reflected image from the mirror 28 is again reflected by a mirror galvanometer 29 onto the screen 18 producing the upper image indicator 16 shown in FIG. 1. An identical optical system (not shown) is employed to create the lower image indicator 17 also shown in FIG. 1.

Figure 3:
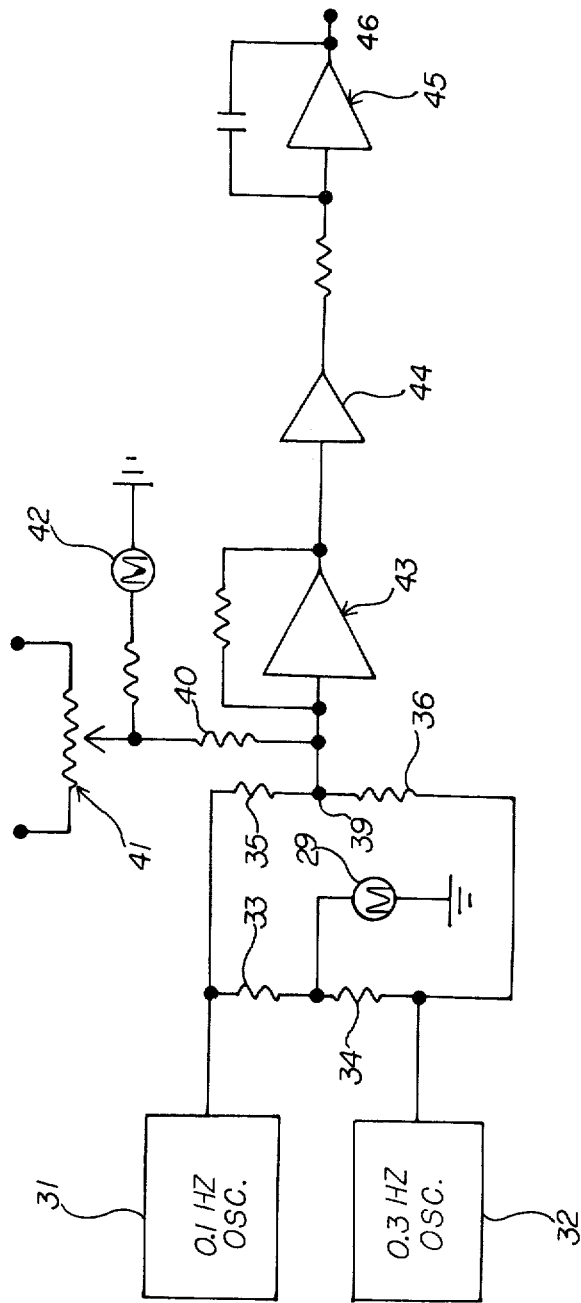
FIG. 3 is a schematic block diagram illustrating an electrical circuit for use with the optical system shown in FIG. 2.

Movement of the image indicators 16 and 17 on the screen 18 is controlled by an electrical circuit schematically illustrated in FIG. 3. A pair of oscillators 31 and 32 provide inputs to a bridge circuit including a pair of resistors 33 and 34 connected in parallel with a second pair of resistors 35 and 36. The oscillators 31 and 32 produce outputs of different frequency of, for example, 0.1 Hz and 0.3 Hz. Connected to the junction between the resistors 33 and 34 is the mirror galvanometer 29 shown in FIG. 2. The junction 39 between the resistors 35 and 36 is connected by a resistor 40 to the output of a potentiometer 41 mechanically coupled to the wheel 11 shown in FIG. 1. Also connected to the potentiometer 41 is a second mirror galvanometer 42 of an optical system (not shown) identical to that shown in FIG. 2 for producing the image indicator 17. The voltage at the junction 39 is applied to an error detector amplifier 43 that provides an input to an inverting buffer amplifier 44. An integrator 45 receives the output from the inverter 44 producing an error signal on line 46.

During operation of the circuit shown in FIG. 3, the galvanometer 29 is driven by a voltage which is the algebraic sum of two low frequency sine wave oscillators 31 and 32. This driving voltage is also present at junction 39 at the input of the error detector amplifier 43. The second galvanometer 42 is driven by a voltage which is the output of the voltage divider potentiometer 41 mechanically connected to the steering wheel 11. As the test subject tracks the oscillator driven indicator 16 by manipulating the wheel 11, the voltage output of the potentiometer 41, which is also applied to the input of the error detector amplifier 43, produces a null voltage when the indicators 16 and 17 are aligned. Thus, the magnitude of the voltage at the output of the error detector amplifier 43 is dependent on how closely the test subject keeps the indicators 16 and 17 lined up. This output voltage is inverted by the inverting buffer 44 before being fed to the integrator 45. Obviously the output of the integrator will increase during the test interval in proportion to the tracking error which can be indicated by a voltmeter (not shown).

Figure 4:
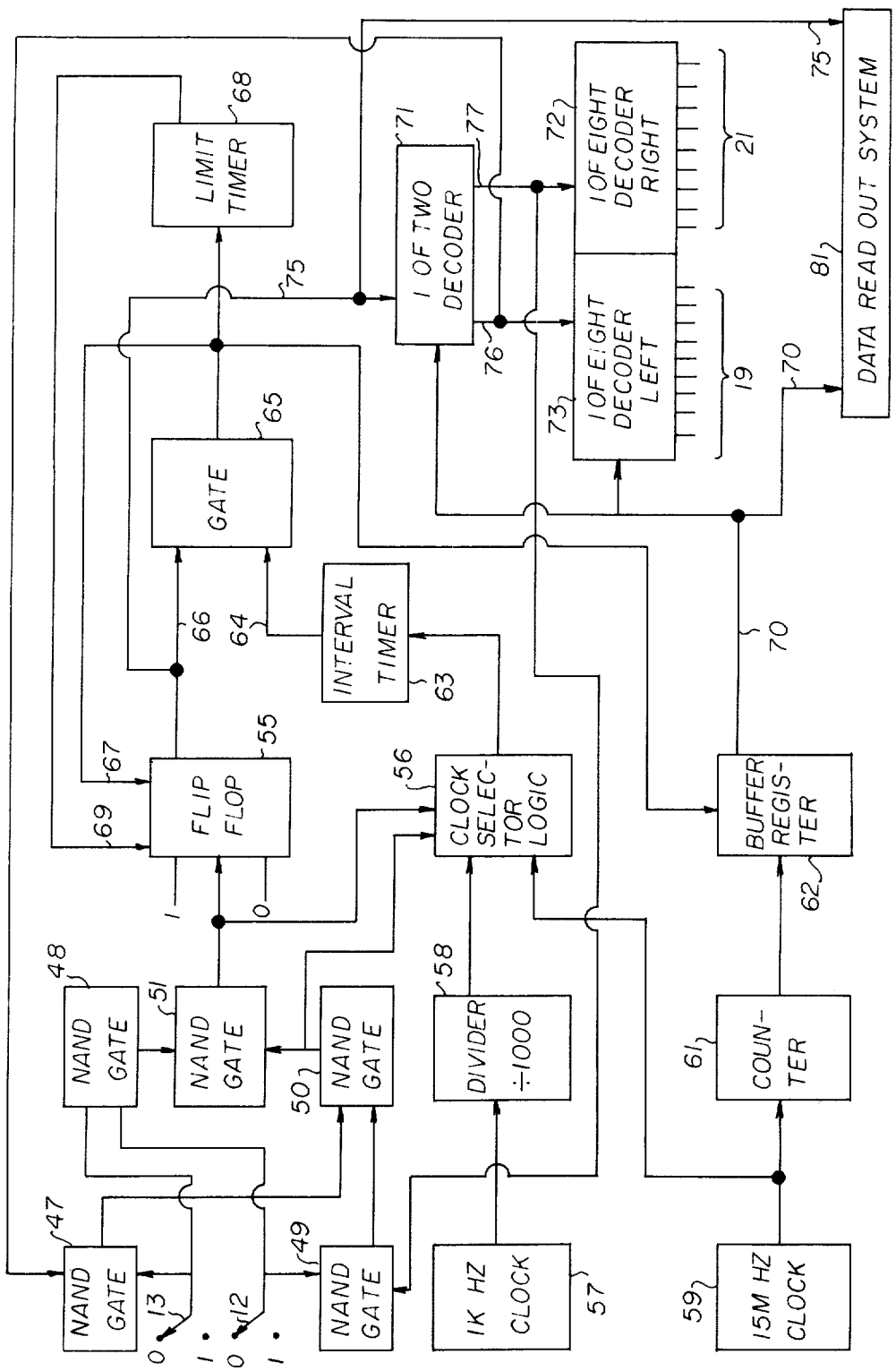
FIG. 4 is a schematic block diagram illustrating an electrical control circuit for the peripheral visual field display and actuator system shown in FIG. 1.

Referring now to FIG. 4 there is shown a block diagram of a circuit for creating the test task for the horizontal peripheral visual field. The right switch button 13 (FIG. 1) provides inputs to each of a pair of Nand Gates 47 and 48 while the left switch button 12 (FIG. 1) is also connected to Nand Gate 48 and to another Nand Gate 49. Receiving outputs from both of the Nand Gates 47 and 49 is a Nand Gate 50 that provides an input to a Clock Selector Logic Circuit 56 and also together with Nand Gate 48 provides inputs to another Nand Gate 51. The Gate 51 feeds inputs to both a Flip Flop 55 and a Clock Selector Logic Circuit 56. Also received by the Logic Circuit 56 on separate input lines are the output of a 1 KHz Clock 57 after division in a Divider 58 and the output of a 15 MHz Clock 59. Responsive to the Clock 59 is a Counter 61, the output of which is applied to a Buffer Register 62. The output of the Logic Circuit 56 controls an Interval Timer 63, the output of which is applied to one input 64 of a Gate 65 having a second input 66 from the Flip Flop 55.

The output of the Gate 65 is applied to an input 67 of the Flip Flop 55, the Buffer Register 62 and a Limit Timer 68 that also provides an input 69 to the Flip Flop 55. Receiving the output code from the Buffer Register 62 on a line 70 are both a one of two Decoder 71 and a pair of one of eight Decoders 72 and 73. The Decoder 71 also receives an input on a line 75 from the Flip Flop 55. One output 76 of the Decoder 71 is applied to both the left Decoder 73 and to the Nand Gate 47 while a second output 77 is applied to both the right Decoder 72 and the Nand Gate 49. The eight outputs of the left Decoder 73 selectively energize the lights 19 shown in FIG. 1 while the eight outputs of the right Decoder 72 selectively energize the lights 21 shown in that Fig.

The operation of the circuit shown in FIG. 4 is as follows. When power is turned on the Flip Flop 55 is set and enables the Ready Gate 65. Light interval timing and light selector sequences are also started. The light time interval is generated by the 1 KHz Clock 57 which is divided by 1000 in the Divider 58 resulting in pulses with a period of 1 second. These pulses are fed through the Selector Logic 56 to the Timer 63 which is a four bit binary counter. The light code is generated by the independent 15 MHz Clock 59 and is fed to the four bit Binary Counter 61 and then to the four bit Light Code Buffer Register 62. The output of the 15 MHz Clock 59 is also fed to the Clock Selector Logic 56.

When the Light Interval Timer 63 counts off approximately 4 seconds, the Light Off Ready Gate 65 is turned on and its output goes to logic zero. This output clears the Light On-Off Flip Flop 55, thus enabling the Decoder 71 and strobes the four bit code on the Light Code Buffer Register 62 to the light Decoders 71–73 resulting in one of the lights 19 or 21 being energized. The logic zero output of the Gate 65 also triggers the Limit Timer 68 producing an output of logic one. After about 1.5 seconds the Timer 68 which is a retriggerable monostable multivibrator times out and goes to logic zero output that is applied to set the Light On-Off Flip Flop 55. This in turn puts a logic one on the inhibit input of the Decoder 71 and turns off the previously energized light. Anytime after one of the lights 19, 21 comes on, the light can also be turned off by depressing the appropriate button switch 12 or 13 connected to the Light Off Nand Gate 51. As described below, only the correct button switch 12 or 13 is enabled by the output from the Decoder 71. When the correct button switch 12 or 13 is depressed, the Light Off Nand Gate 51 output goes to logic zero and sets the Light On-Off Flip Flop 55 producing a logic one signal that is applied to the Inhibit terminal of the Decoder 71 and causes the light to go off. At the same time, when the correct button switch 12 or 13 is depressed, the Selector Logic 56 is disabled by the one output from the Nand Gate 50 allowing the output of the 15 MHz Clock 59 to run the Timer 63. This increments the Light Interval Timer 63 at a very high rate while the button switch remains depressed. As soon as the switch is released, however, a one output from the Nand Gate 51 enables the Selector Logic 56 so that the 1 KHz Clock 57 again increments the Light Interval Timer 63 at a one count per second rate. This results in a random time interval between energization of lights which varies from about zero to 4.3 seconds. It will be apparent that the randomness of the light sequence results from the two independent Clocks 59 and 57 which are not synchronized and are sequentially enabled by the test subjects operation of the switches 12 and 13.

As noted above the only button switch 12 or 13 enabled corresponds to the light set 19 or 21 in which a light is energized. For example, the right button switch 13 is enabled only when the right light Decoder 72 is enabled by the Decoder 71 and one of the right lights 21 is turned on. A zero logic level input on line 77 enables the right Decoder 72. At the same time a one logic level signal on line 76 will be applied to Nand Gate 47. Thus, actuation of the right button switch 13 provides a second one logic level signal that enables the Gate 47 producing an enabling signal for the Nand Gate 50. The resultant one level output of the Nand Gate 50 enables the Nand Gate 51, the output of which sets the Flip Flop 55 to extinguish the energized light as described above.

Conversely, during this period the Nand Gate 49 is connected to the Right Decoder input on line 77. Since this line is at logic level zero when a right light is on, the Nand Gate 49 and, accordingly, the left button switch 12 will be disabled and therefore cannot extinguish any right light. It will be obvious that the opposite conditions exist when the Left Decoder 73 is enabled and one of the left lights 19 is turned on. In that case only the Nand Gate 49 can be enabled by actuation of the left switch 12.

If both button switches 12 and 13 are depressed simultaneously, none of the lights can be turned off. When both switches are depressed both inputs to the Nand Gate 48 go to logic level one producing a zero level output that disables the Nand Gate 51 and prevents light turn off by the Flip Flop 55.

It will be obvious that the circuit shown in FIG. 4 could be used to operate any number of lights by increasing or decreasing the number bits of the Light Code Counter 61 and adding to or subtracting from the number of the Decoders 71–73. Also, the light time interval can be changed by changing the frequency of the Clocks 57 and 59 or the number of clock bits which are anded to turn on the Light Off Ready Gate 65.

The test results provided by the system shown in FIG. 4 are applied to a Data Read Out System 81. Information regarding the sequence in which the specific lights 19 and 21 are energized is received from the Buffer Register 62 on line 70 while the response of the test subject is monitored by the output of the Flip Flop 55 on line 75. It will be apparent that the System 81 can comprise either a conventional print-out system or the ignition interlock mechanism of a vehicle.

To pass the test provided by the systems shown in FIGS. 1–4, the test subject must turn the steering wheel 11 to move the image indicator 17 along with the image indicator 16 to be tracked. Meanwhile, lights 19 and 21 will appear at random in space and time in the peripheral visual field. When a light 21 appears on the right side, the operator must press the right hand button switch 13 on the steering wheel 11 as quickly as possible. When a light 19 appears on the left side, the operator must press the left hand button switch 12 on the steering wheel 11 as quickly as possible. To pass the test, the operator must both track the pursuit tracking task with less than or equal to a predetermined value of volt-seconds of absolute integrated error on output line 46 (FIG. 3) and react to the peripheral lights 19 and 21 in less than or equal to a predetermined average time period.

The visual divided attention tasks provided by the systems shown in FIGS. 1–4 are uniquely suited for intoxication testing for the following reasons. When intoxicated, an individual's ability to perform a divided attention task is increasingly debilitated. The present invention is sensitive to such debilitation by its requirement of the simultaneous performance of two unrelated tasks. Also, when intoxicated, an individual's ability to perform a pursuit tracking task is increasingly debilitated. The invention is sensitive also to such debilitation by virtue of the pursuit tracking task illustrated in FIGS. 2 and 3. In addition, an intoxicated individual's choice reaction time increases. This factor is tested by virtue of the measurement of ipsilated reaction times to the energized lights 19 and 21 in the peripheral visual field. Finally, when intoxicated, an individual's eye movement pattern is increasingly affected. This invention is sensitive to such an alteration in eye movement pattern by virtue of the visual stimuli spatially distributed throughout the horizontal peripheral visual field as shown in FIG. 1.

Obviously, many modifications and variations of the present invention are possible in light of the above teachings. For example, first, the optical system illustrated in FIG. 2 can be replaced by opposing electromechanical galvanometer movements. One movement indicator replacing the image indicator 16, the other 17 shown in FIG. 1. The purpose of this improvement is to permit the device to withstand increased shock and vibration in the field. Second, an equal number of left 19 and right 21 side lights in the periphery as shown in FIG. 1 may be removed thereby reducing not only the overall physical size of the display but also the task duration. If the relative difficulty of each of the two tasks is preserved, the task duration will be directly proportional to the number of peripheral lights eliminated. Further, not only a reduction in duration but also an improvement in sensitivity to the debilitating effects of alcohol could result from increasing the difficulty of one or both of the task components. Such an increase in difficulty can be accomplished most readily for the pursuit tracking task by increasing the frequency of one or both of the oscillators 31 and 32 of FIG. 3 and for the peripheral visual field task by an incrase in the 1 KHz Clock 57 of FIG. 4. It is to be understood, therefore, that the invention can be practiced otherwise than as specifically described.

We claim:

1. A divided attention intoxication testing apparatus comprising:
   first pursuit tracking display means for providing a first randomly varying display visible to a person being tested;
   first actuator means selectively operable by the person to produce first selected responses;
   first comparison means for comparing said first varying display with said first responses;
   second peripheral visual field display means for providing a second randomly varying display visible to the person viewing said first display;
   second actuator means different from said first actuator means and selectively operable by the person to produce second responses;
   second comparison means different from said first comparison means for comparing said second display with said second responses; and
   evaluation means for evaluating the comparisons made by said first and second comparison means.

2. Apparatus according to claim 1 wherein said second display means comprises random generator means responsive to said second actuator means for randomly varying said second display.

3. Apparatus according to claim 1 wherein said second display means comprises a plurality of lights and energizing means for selectively energizing individual ones of said plurality of lights.

4. Apparatus according to claim 3 wherein said energizing means comprises random generator means for energizing said plurality of lights in a random sequence and for randomly varying the energization period of said energized lights.

5. Apparatus according to claim 4 wherein said energizing means further comprises control means rendering said random generator means responsive to said second actuator means.

6. Apparatus according to claim 5 wherein said second actuator means comprises a plurality of actuators each associated with a distinct set of said plurality of lights.

7. Apparatus according to claim 6 wherein each of said plurality of actuators comprises an electrical switch disposed adjacent to said set of lights with which it is associated.

8. Apparatus according to claim 7 wherein said first display means comprises a screen, a target indicator movable on said screen, target control means for moving said target indicator on said screen, and a tracking indicator movable on said screen in response to operation of said first actuator.

9. Apparatus according to claim 8 wherein said light sets comprise a pair of light arrays that straddle said screen.

10. Apparatus according to claim 9 wherein said first actuator is a rotatable wheel and said electrical switches are mounted on diametrically opposed positions thereon.

* * * * *